United States Patent Office 2,942,914
Patented June 28, 1960

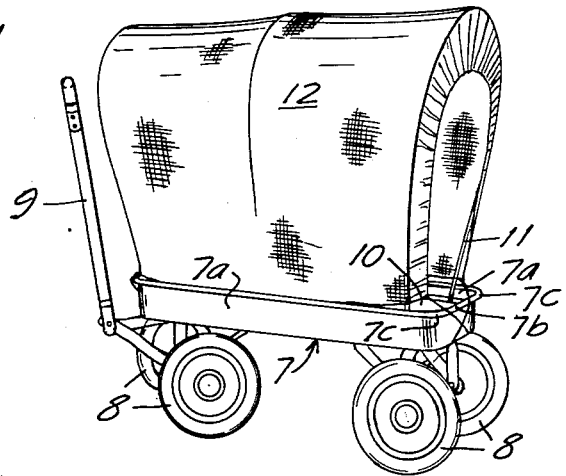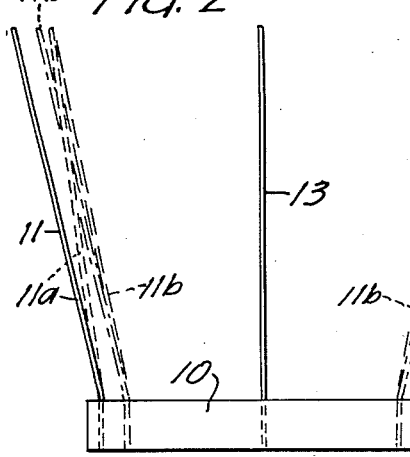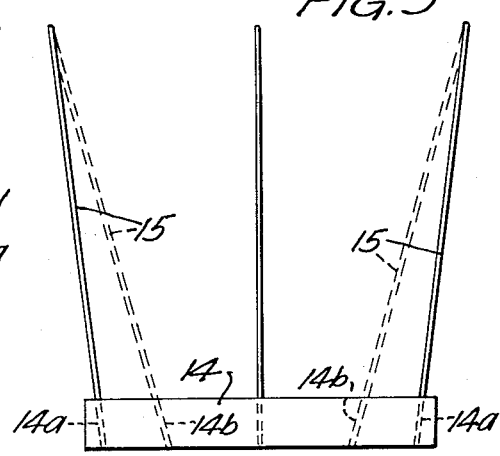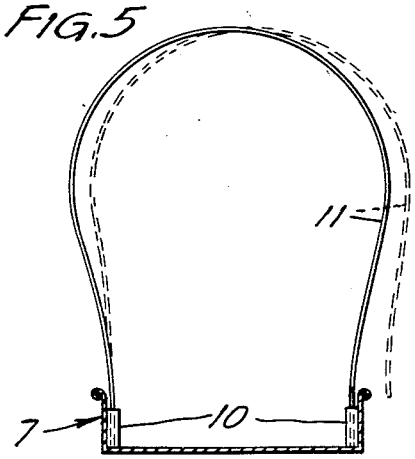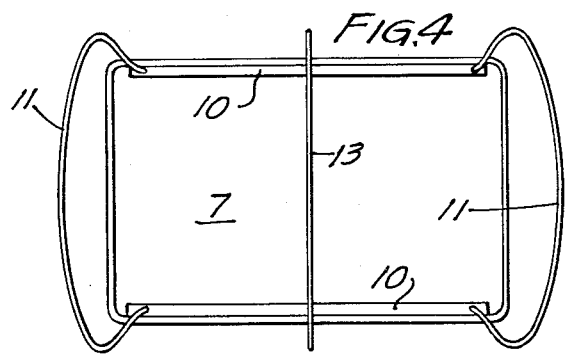

2,942,914
WAGON COVERING ATTACHMENT FOR CHILD'S WAGON

Paul R. Noot, 4707 Washburn Ave. N., Minneapolis, Minn.

Filed Mar. 19, 1958, Ser. No. 722,527

2 Claims. (Cl. 296—102)

This invention relates to a covering attachment for children's wagons and the like and more specifically to an assembly which can be easily and quickly mounted on a conventional wagon.

It is an object of my present invention to provide an attachment for conventional children's wagons and the like which is capable of being quickly and easily mounted on the wagon body to provide a protective covering therefor.

More specifically it is an object to provide a supporting frame structure for a wagon covering which includes mounting elements for supporting the base portions thereof and combining with the cover supporting frame to securely anchor the lower ends of the frame in the wagon body.

Still more specifically, it is an object to provide base mounting members adapted to fit snugly along the sides to the wagon box and provided with means for securely attaching the lower ends of a plurality of covering supporting bows and particularly arranged to combine the said bows to provide a supporting frame for a particular cover size even with varying lengths of wagons, said bows being constructed to securely hold said mounting members against the inside of the wagon box and thus prevent lateral as well as longitudinal shifting movement of the cover assembly when mounted on the wagon.

These and other objects and advantages of this invention will more fully appear from the following description made in connection with the accompanying drawings wherein like reference characters refer to the same or similar parts throughout the several views, and in which:

Fig. 1 is a perspective view showing my attachment mounted on a child's wagon;

Fig. 2 is a side elevational view of one form of my invention with the cover removed;

Fig. 3 is a side elevational view of a modified form of the invention with the cover removed;

Fig. 4 is a top plan view of the assembly mounted on a wagon without the cover; and Fig. 5 is a vertical sectional view taken substantially along the line 5—5 of Fig. 4 and showing one of the bows before attachment to the base member.

As illustrated in the accompanying drawings I show a wagon of conventional construction having a box 7 with sides 7a and ends 7b. In the form shown the corners 7c are rounded. Suitable wheels 8 are provided and a steering handle 9 of conventional design is connected with the front wheels to facilitate steering the wagon in the usual manner.

I provide bow receiving and anchoring means which, in the embodiment illustrated, consist in a pair of mounting or base members for positioning within the wagon box 7 along the inside of the sides 7a. In the form shown these base members 10 are sufficiently long to fit snugly within the wagon box 7 so that there is no longitudinal movement thereof when said members are disposed along the inside of the sides 7a.

In the form A of my invention illustrated in Fig. 2 a plurality of spaced apart vertically disposed openings are formed in the base members 10 and the lower free end portions of cover supporting bow members 11 are received in the respective openings as best shown in Fig. 2. The two outer bow members 11 are made from resilient material such as spring wire and are bent slightly at the bottom thereof as illustrated in Fig. 2 so that with long wagons the same may be positioned in the outer openings in members 10 so that the upper portion slopes outwardly away from the center line of the wagon box as shown by the numeral 11a in Fig. 2. The cover is then applied and the bows will be pulled in by the cover to the dotted position 11a. However, if the wagon is shorter and the base members are cut off to fit snugly within the box 7 the bows 11 are inserted into openings disposed in more closely spaced relation and the upper portions thereof will slope outwardly as indicated at 11b in Fig. 2. It will be seen that the upper ends of the bows, whether in dotted position 11a or 11b are disposed in substantially equally spaced apart relation so that a cover such as the cover 12 may be snugly attached around said bows as shown in Fig. 1. Suitable means such as draw strings are provided for retaining the cover in place on the bow frames. A bow 13 is provided for supporting the central portion of the cover and the lower ends thereof are inserted into suitable openings drilled into intermediate portions of the base members 10. As best shown in Fig. 5 the bows are all constructed of resilient material such as spring steel or the like and the lower ends thereof are spaced apart a distance greater than the width of the wagon on which the same are to be mounted. This requires compresison of the lower end portions of said bow members thus producing tensioning of the bow members to resiliently but firmly urge said base members 10 outwardly into engagement with the inside surfaces of the respective sides 7a. The draw strings 12a are connected with the wagon and serve as hold down elements for the entire covering assembly as illustrated.

Form B of my invention is shown in Fig. 3 wherein the end openings 14a are drilled in the base members 14 at a slight angle to slope slightly outwardly and the inner openings 14b are slanted outwardly and at a greater angle from the vertical. In this form of the invention the lower ends of bow members 15 are substantially straight and lie in a single plane as shown in Fig. 3 and said plane is positioned by the openings into which said bows are inserted in the base members. In the case of the short wagons it is, of course, desired that bows are sloped outwardly to a greater extent in order to properly fit within the end portions of the cover 12 and in the case of long wagons the bows are disposed in more upright position so that the same size covering will fit thereover.

It will be seen that I have provided a highly ingenious and novel covering attachment for children's wagons and the like wherein the cover supporting bow members cooperate with a pair of base members to provide a stable support for the cover by urging said base members outwardly into engagement with the inside surfaces of the side walls 7a of the wagon box. Since wagons are manufactured in different sizes it is important that an attachment covering be provided which will fit substantially all sizes. It is obviously convenient to manufacture one single sized covering for substantially all sized wagons and, therefore, I have provided two forms of bow members and base mounting means therefor, which will permit the same size covering to be used with various lengths of wagons.

It will, of course, be understood the various changes may be made in the details, form, arrangement and preparation of the parts without departing from the scope of my invention which generally stated consists in the matter set forth in the accompanying claims.

What I claim is:

1. A cover attachment assembly for children's wagons of the type having upstanding spaced apart longitudinal side members defining a box area therebetween, said attachment comprising in combination a pair of longitudinal base members adapted to be received in spaced relationship in said box area adjacent said longitudinal side members and defining a gap therebetween having a certain width dimension, a plurality of generally U-shaped resilient bow members having the ends thereof retained in said base members, and a cover adapted to be received on said bow members and to be supported thereon, said resilient bow members having the ends thereof normally spaced apart a distance exceeding said certain width dimension and being adapted to be compressed to the extent that said base members may be positioned within said box area and adjacent to said sides thus to resiliently urge said longitudinal base members against said longitudinal side members.

2. The cover attachment assembly of claim 1 being further characterized in that said longitudinal base members are bored so as to form sockets therein, the sockets being arranged to receive the ends of said bows therein.

References Cited in the file of this patent

UNITED STATES PATENTS

| D. 155,894 | Hedlund | Nov. 8, 1949 |
| 307,978 | Parks | Nov. 11, 1884 |
| 953,965 | Moffitt | Apr. 5, 1910 |
| 1,195,316 | Womack | Aug. 22, 1916 |
| 1,538,384 | Crockett | May 19, 1925 |
| 2,846,262 | Ray | Aug. 5, 1958 |

FOREIGN PATENTS

| 536,026 | Germany | Oct. 17, 1931 |